United States Patent
Barazza

(10) Patent No.: US 7,025,465 B2
(45) Date of Patent: Apr. 11, 2006

(54) FOCUSING SYSTEM FOR VIDEOPROJECTOR

(75) Inventor: Giorgio Barazza, Pordenone (IT)

(73) Assignee: SIM2 Multimedia S.p.A., Pordenone (IT)

( * ) Notice: Subject to any disclaimer, the term of this patent is extended or adjusted under 35 U.S.C. 154(b) by 106 days.

(21) Appl. No.: 10/477,867

(22) PCT Filed: Jan. 23, 2001

(86) PCT No.: PCT/IB01/00070

§ 371 (c)(1),
(2), (4) Date: Nov. 14, 2003

(87) PCT Pub. No.: WO01/55771

PCT Pub. Date: Aug. 2, 2001

(65) Prior Publication Data

US 2005/0046754 A1    Mar. 3, 2005

(30) Foreign Application Priority Data

Jan. 26, 2000    (IT) .......................... TO2000A0075

(51) Int. Cl.
*G02B 27/18* (2006.01)
*G03B 21/20* (2006.01)

(52) U.S. Cl. ......................................... 353/102; 353/31
(58) Field of Classification Search .................. 353/20, 353/33, 81, 98, 99, 102, 31; 348/770, 771, 348/759

See application file for complete search history.

(56) References Cited

U.S. PATENT DOCUMENTS

| | | | | |
|---|---|---|---|---|
| 5,210,646 A | * | 5/1993 | Mercado et al. | 359/793 |
| 6,315,415 B1 | * | 11/2001 | Hayashi et al. | 353/98 |
| 6,439,726 B1 | * | 8/2002 | Piehler | 353/98 |
| 6,552,740 B1 | * | 4/2003 | Wong et al. | 347/239 |
| 2002/0118310 A1 | * | 8/2002 | DeLong | 348/771 |

* cited by examiner

*Primary Examiner*—W. B. Perkey
*Assistant Examiner*—Andrew Sever
(74) *Attorney, Agent, or Firm*—Levine & Mandelbaum

(57) ABSTRACT

Abstract Focusing system of the light beam for a videoprojector or comprising at least an image microforming device DMD (Digital Micromirror Device); the main feature of the system consisting in that it comprises at least an aspheric lens associated to at least an achromatic doublet. This configuration allows a substantial reduction of chromatic aberration, spherical aberration, curvature of field and the distortions, obtaining a more homogeneous illumination of the image microforming device.

8 Claims, 2 Drawing Sheets

FOCUSING SYSTEM FOR VIDEOPROJECTOR

BACKGROUND OF THE INVENTION

The present invention refers to a focusing system of the light beam for a videoprojector comprising at least an image microforming device DMD (Digital Micromirror Device). Videoprojection systems based on image microforming devices DMD (Digital Micromirror Device) are spreading more an more, above all for their excellent image quality, in particular for their brightness and resolution, as well as for the small size of projectors, compared e.g. to the devices using kinescopes.

Shortly, an image microforming device DMD consists of a set of aluminum square mirrors with a 16 µm side, each one of them forming an element of the image to be projected, i.e. a pixel. The mirrors can rotate by ±10 degrees around a diagonal, and the rotation in either direction is produced by the action of two electrodes located under the mirror on opposite sides with respect to the rotating axis. The light hits the mirror with an angle of about 20 degrees with respect to the perpendicular at the mirror plane, when the latter is in its "rest" condition, i.e. when it is not attracted by one of the two electrodes. When the mirror is rotated in one direction, the reflected ray will be deflected and not enter in the projection lens; consequently it is not sent to the screen, i.e. the pixel is "off"; if the rotation occurs in the opposite direction, then the pixel is "on", since the reflected light is sent to the screen.

To each pixel is associated a cell of a static memory of the type SRAM (Static Random Access Memory), containing all information for controlling the electrodes that ensure mirror rotation. Even if the light reflected by each mirror always has the same intensity, changing the time during which a pixel remains on will cause brightness to change due to an integrating action produced by the human eye.

A videoprojector may comprise one, two or three image microforming devices DMD. The solution utilizing only one image microforming device DMD is particularly advantageous for its low-cost, overall dimensions and weight; the present invention is mainly related to this solution.

In order to obtain a colored image when using only one DMD device, the mirrors of the image microforming device DMD are illuminated sequentially by the three primary colors, i.e. red, green and blue, which are obtained sending the light of the lighting lamp to a revolving wheel, called color wheel, divided at least in three sectors, each one consisting of a dichroic filter apt to produce one of the three primary colors. By means of the rotation of the color wheel, the light beam sent to the image microforming device DMD will take all three different colors sequentially.

In the videoprojector the light beam requires focusing. This is usually obtained by means of a convergent lens system, also known as "relay lens"; the focusing plane can be obtained on the entry of the projection lens, according to the known Kohler's configuration; alternately, the focusing plane can be localized on the surface of the image microforming device DMD, according to the critical or Abbe's illumination configuration. The latter configuration has the advantage to obtain the vertical centering of the image on the projection screen, since the image size on the image microforming device DMD is big enough to ensure a ±6 mm displacement of the projection lens in a perpendicular direction to the projection axis without loosing its brightness. In the instance of a frontal projection, this permits the vertical displacement of the image on the screen by an amount about equal to the height of the image itself.

The focusing systems know, using at least three converging lenses, have the drawback of a poorly defined image quality, mainly due to chromatic aberration phenomena, spherical aberration, as well as a further aberration phenomenon called curvature of field. Moreover, said convergent lenses generally produce considerable image distortions. As known, the chromatic aberration phenomenon is due to the focusing plane of the light beam crossing a convergent lens depending on the wavelength of the light beam components, so that a blue light beam, for example, converges on a plane nearer to the lens, whereas a red light beam will converge on a farther plane; a green light beam will focus on an intermediate plane between the planes associated to the blue light beam and red light beam. In the instance of a videoprojector having only one image microforming device DMD, focusing on the surface of the image microforming device DMD, according to Abbe's illumination configuration, is the result of a compromise between the focusing surfaces of the three primary colors. The same considerations apply in the instance of Kohler's configuration, where the beam converges at the entry of the projection lens. The spherical aberration phenomenon occurs when a light beam crosses a convergent lens, in which case the so-called marginal rays of said light beam, i.e. the rays crossing the lens in its peripheral area, will converge to a nearer point to the lens plane of the so-called paraxial rays, that cross the lens in the central area. Also in this instance focusing is the result of a compromise between the central or paraxial rays and peripheral rays. The curvature of field phenomenon is due to the fact that the image focused by the lens is correctly focused on a curved surface rather than on a plane. Also in this instance, being the mirrors of the image microforming device DMD arranged on a flat surface, focusing is the result of a compromise. Finally, the term distortions indicates geometric deformations of the image, the most important ones being the so-called "tilt" deformation, which occurs e.g. when a rectangle projected through the lens system takes the shape of a parallelogram, the distortions know as cushion distortion and barrel distortion.

In order to reduce the above aberrations and distortions, appropriate lens systems are usually suggested, where each effect is corrected by a special optical device, with the result to increase the number of lenses, and the consequent higher projecting complexity and costs.

SUMMARY OF THE INVENTION

It is the object of the present invention to solve the above drawbacks and provide a focusing system for videoprojectors having an improved realization and more efficient with respect to existing solutions.

In this frame, it is the main object of the present invention to provide a focusing system for videoprojectors obviating to the above drawbacks, which allows focusing an image uniformly and with lesser distortions in a simple and economic manner, improving the image quality appreciably and using a reduced number of lenses.

In order to achieve such aims, it is the object of the present invention to provide a focusing system for videoprojectors incorporating the features of the annexed claims, which form an integral part of the description herein.

Further objects, features and advantages of the present invention will become apparent from the following detailed description and annexed drawings, which are supplied by way of non limiting example, wherein:

DESCRIPTION OF THE PREFERRED EMBODIMENT

Figure 1:
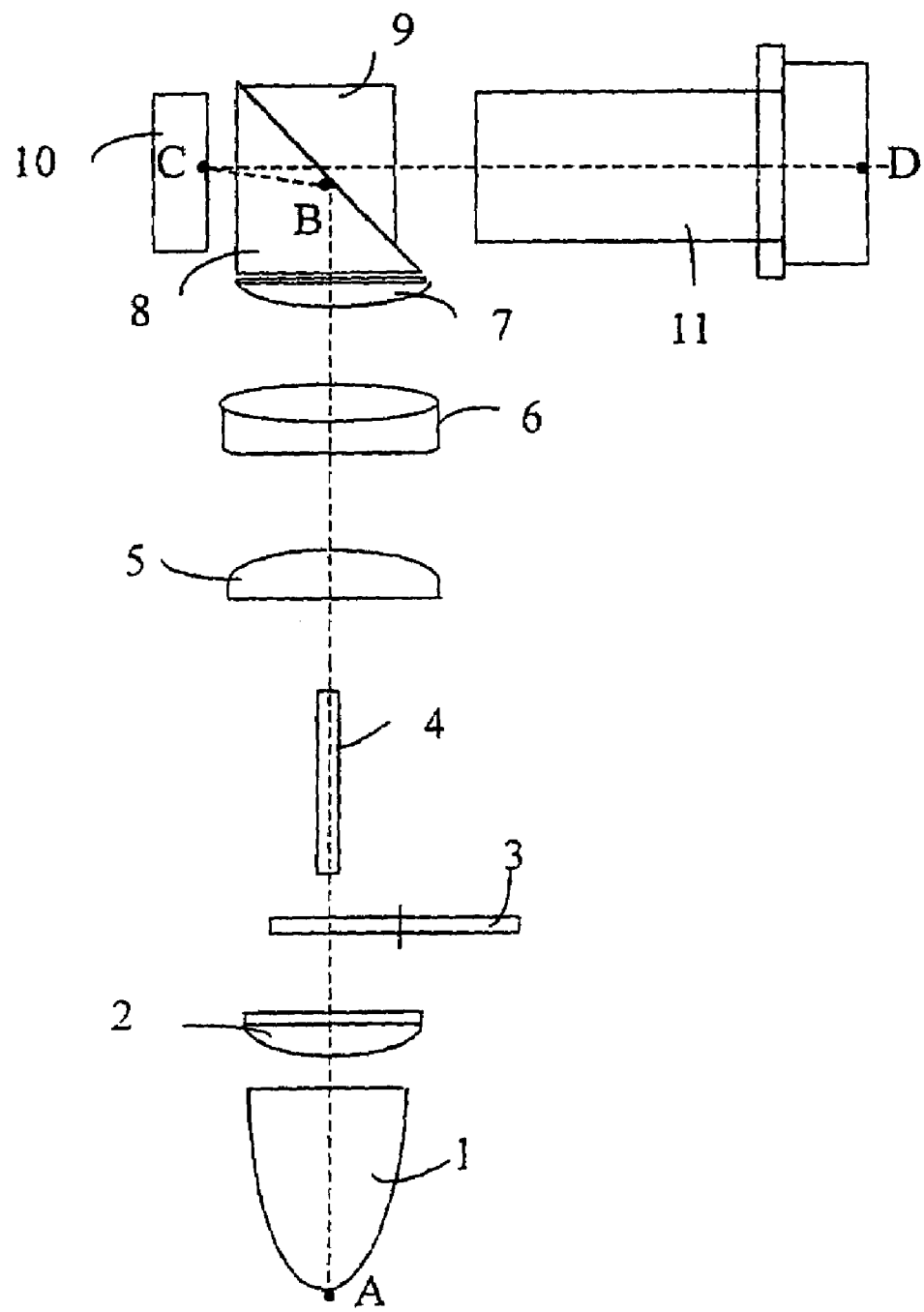
FIG. 1 shows the diagram of a focusing system for videoprojectors, according to the invention.

In FIG. 1, reference 1 indicates an illuminating lamp with a parabolic reflector, reference 2 indicates an aspheric capacitor focusing the light at the entry of an integrating bar 4 formed by an optical glass parallelepiped, which ensures an uniform light beam from the illuminating lamp 1. The integrating bar 4 is preceded by a colour wheel 3 that, as said above, by means of its dichroic filters permits the reproduction of the colours in the videoprojectors using only one image microforming device DMD, as for the instance described herein. The exit light from the integrating bar 4 is collected by a lens system, known as relay lens. Relay lens mean a lens system and other optical devices transferring the image to the objective or projection lens. Said relay lens are indicated with references 5, 6 and 7. Said lenses 5, 6, 7 convey the light to the image microforming device DMD, indicated with 10, on which an enlarged focused image is formed with respect to the image at the exit of the integrating bar 4, according to Abbe's illumination configuration mentioned above. However, the following considerations also apply in the event of the image being focused at the entry of a projection lens indicated with reference 11 (Kohler's illumination) in FIG. 1, as further described.

According to the invention, the lens indicated with reference 5 is obtained by means of an aspheric lens, i.e. a convergent lens whose profile is modified with respect to the spherical profile of a standard convergent lens, so as to reduce spherical aberration. In mathematical terms, the curved surface of the lens is represented by an equation, which besides its spherical components also contains polynomial components in a order higher than the second order.

Along the optical path of the light beam represented in the figure by the dotted line going through the points ABCD, the spherical lens 5 is followed by an achromatic doublet indicated with reference 6. The achromatic doublet 6 is formed, as known, by a divergent lens and a convergent lens, obtained with different optical glasses bonded to each other. Chromatic aberration will be appreciably reduced if the refraction coefficients of both glasses is selected appropriately.

Advantageously, too, besides transferring the image as a relay lens and the single compensation effect of a specific aberration due to single lenses, the combined effect of the aspheric lens 5 and achromatic doublet 6 will substantially reduce both the curvature of field phenomenon and image distortions previously mentioned.

It is obvious that the profile of the aspheric lens 5 and refraction coefficients of the optical glasses used in the achromatic doublet 6 are also chosen depending on the features of the optical path ABC extending from the lamp 1 to the image microforming device DMD 10, such as its length, number of reflections, light beam section, etc.

The achromatic doublet 6 is followed in turn by a convergent lens indicated with reference 7, completing the relay lens system.

Therefore, using a simple low-cost three-lens system, consisting of an aspheric lens 5, achromatic doublet 6 and convergent lens 7 as a relay lens system, leads to a substantial reduction of main geometric and chromatic aberrations, as well as of the distortions introduced by the focusing system. Preferably, the lens 7 is a plano-convex lens, so as to further reduce spherical aberration.

The prism indicated with reference 8 is a TIR (Total Internal Reflection) prism type, which conveys the light beam to the image microforming device DMD 10 to have an angle incidence of about 20 degrees, as usually required by the specifications issued by the device manufacturer.

The prism 9 deflects the light beam coming from the mirrors of the image microforming device DMD towards the projection lens 11.

The simultaneous use of the aspheric lens 5 and of the achromatic doublet 6 will further advantageously allow consistent illumination of the surface of the image microforming device DMD 10, avoiding a brighter central area of the image with respect to peripheral areas.

Finally, reducing spherical aberration will advantageously concentrate the light more precisely on the active area of the image microforming device DMD 10, i.e. the one containing the mirrors, thus increasing global efficiency and consequently the system brightness.

Figure 2:
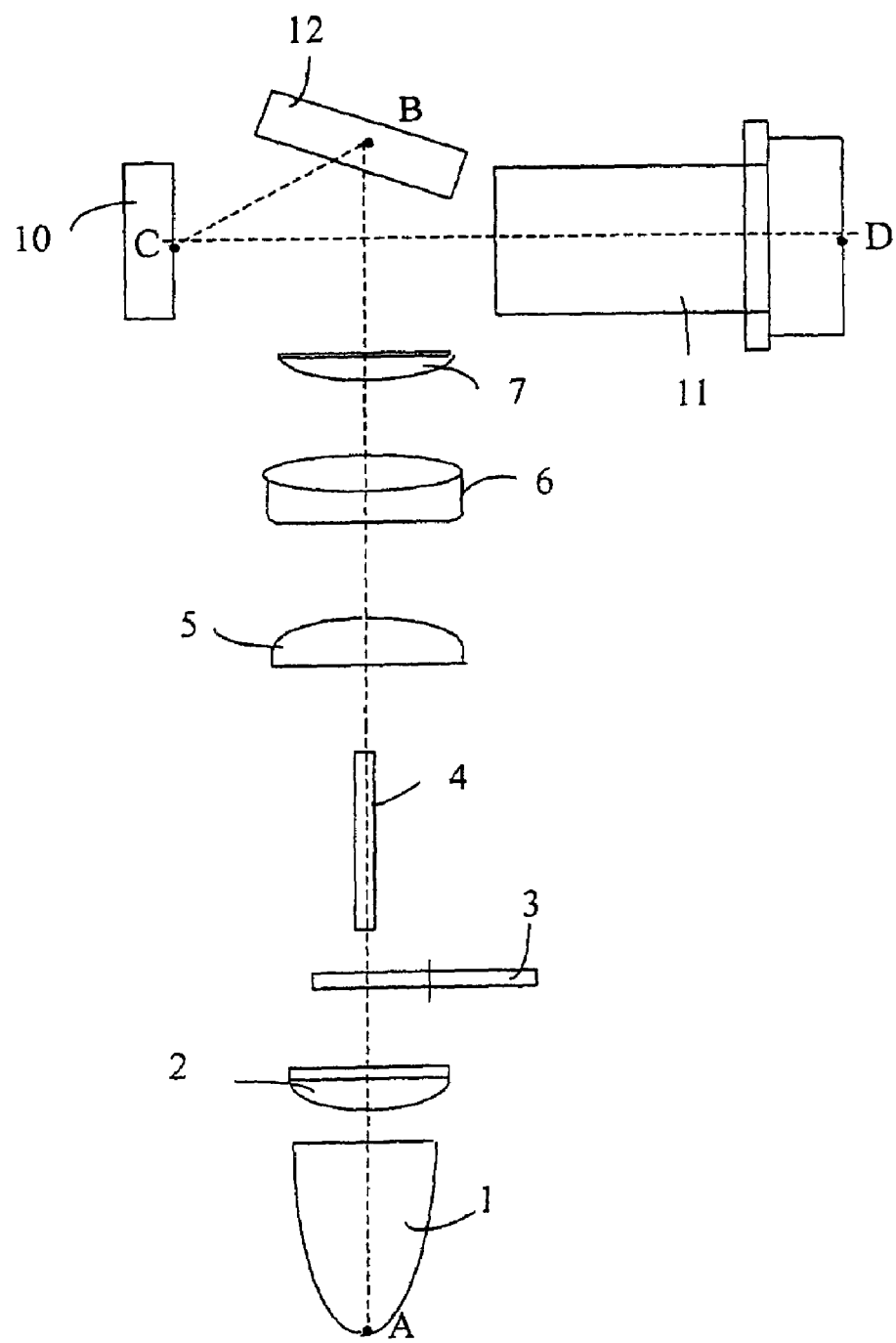
FIG. 2 shows a second embodiment of a focusing system for videoprojectors, according to the invention.

FIG. 2 represents a focusing system according to the invention in the event that a Kohler's illumination configuration is utilized, i.e. when the image is focused at the entry of the projection lens 11.

In this instance, the light beam is sent to the image microforming device DMD with the correct angle shot by the mirror indicated with reference 12, so that the prisms 8 and 9 of FIG. 1 are not used. In order to avoid likely mechanical interferences between the components and optical path, the mirror 12 will also deviate the beam, e.g. upwards, according to a common technique in the videoprojectors with image microforming devices DMD. The remaining blocks of FIG. 2 indicating the same reference numbers perform the same function as the ones already described in FIG. 1.

It is obvious that many changes are possible for the man skilled in the art to the focusing system for videoprojectors described above by way of example, without departing from the novelty spirit of the innovative idea, and it is also clear that in practical actuation of the invention the components may be different in form and size from the ones described and be replaced with technical equivalent elements.

By way of example, the portion ABC of the optical path extending from the lamp 1 to the image microforming device DMD 10 may comprise several reflections instead of only one as in the instance of FIGS. 1 and 2.

It should be noticed that the above focusing system may be used, though with fewer advantages, in videoprojectors using two or more image microforming devices DMD.

The invention claimed is:

1. A light beam focusing system for a videoprojector of the type comprising a light source, means for optical integration, optical means for transferring an image to a projection lens of the videoprojector and an image microforming device, said optical means comprising a relay lens system for transferring the image, wherein said relay lens system comprises at least an aspheric lens and an achromatic doublet, said aspheric lens being separated from the achromatic doublet.

2. A light beam focusing system for a videoprojector according to claim 1, wherein the aspheric lens and the achromatic doublet are located sequentially on the light beam path.

3. A light beam focusing system for a videoprojector according to claim 1, wherein the achromatic doublet comprises at least two types of optical glasses having different refraction coefficients.

4. A light beam focusing system for a videoprojector according to claim 1, further comprising a plano-convex lens.

5. A light beam focusing system for a videoprojector according to claim 4, wherein the optical path of the light beam extending from the light source to the image microforming device includes one or more reflectors.

6. A light beam focusing system for a videoprojector according to claim 1, wherein the image is focused on the surface of the image microforming device according to Abbe's illumination configuration.

7. A light beam focusing system for a videoprojector according to claim 6, wherein the optical path of the light beam extending from the light source to the image microforming device includes one or more reflectors.

8. A light beam focusing system for a videoprojector according to claim 1, wherein the focusing of the image, subsequently to the image microforming device, occurs at the entry of the projection lens, according to Kohler's illumination configuration.

* * * * *